US011258197B2

(12) United States Patent
Jen et al.

(10) Patent No.: US 11,258,197 B2
(45) Date of Patent: Feb. 22, 2022

(54) WEARABLE DISPLAY DEVICE

(71) Applicant: Wistron Corporation, New Taipei (TW)

(72) Inventors: Tsu-Yin Jen, New Taipei (TW); Pei-Hsin Huang, New Taipei (TW); Lee-Hua Yu, New Taipei (TW)

(73) Assignee: Wistron Corporation, New Taipei (TW)

( * ) Notice: Subject to any disclaimer, the term of this patent is extended or adjusted under 35 U.S.C. 154(b) by 73 days.

(21) Appl. No.: 16/587,041

(22) Filed: Sep. 29, 2019

(65) Prior Publication Data
US 2020/0403352 A1 Dec. 24, 2020

(30) Foreign Application Priority Data
Jun. 24, 2019 (TW) ................................. 108121898

(51) Int. Cl.
*G02C 1/00* (2006.01)
*H01R 13/516* (2006.01)
*G06T 3/00* (2006.01)

(52) U.S. Cl.
CPC ........... *H01R 13/516* (2013.01); *G06T 3/005* (2013.01)

(58) Field of Classification Search
CPC ...... G02C 11/10; G02C 5/146; G02C 5/2209; G02C 7/086; G02C 2200/08; G02C 11/02
USPC ............ 351/158, 41, 52, 111, 116–123, 138; 359/13–14, 34, 629–633, 558, 566–569; 345/7–8; 349/11
See application file for complete search history.

(56) References Cited

U.S. PATENT DOCUMENTS

| | | | |
|---|---|---|---|
| 6,421,031 B1 | 7/2002 | Ronzani et al. | |
| 8,465,151 B2* | 6/2013 | Howell | G02C 5/143 351/121 |
| 10,025,103 B2 | 7/2018 | Sugihara et al. | |
| 11,082,765 B2* | 8/2021 | Khaleghimeybodi | H04R 1/1041 |
| 11,150,674 B2* | 10/2021 | Liu | G02B 27/0176 |
| 2011/0215931 A1 | 9/2011 | Callsen et al. | |
| 2015/0212329 A1 | 7/2015 | Sugihara et al. | |
| 2017/0172222 A1 | 6/2017 | Morgenthau et al. | |
| 2021/0041701 A1* | 2/2021 | Kassner | G02C 9/04 |
| 2021/0063774 A1* | 3/2021 | Wang | H04R 1/1075 |
| 2021/0103146 A1* | 4/2021 | Travers | H04R 1/08 |
| 2021/0116724 A1* | 4/2021 | Wang | G02C 11/10 |
| 2021/0149205 A1* | 5/2021 | Jen | G02B 7/002 |

FOREIGN PATENT DOCUMENTS

| | | |
|---|---|---|
| CN | 104756482 | 7/2015 |
| CN | 104808781 | 7/2015 |
| CN | 207557585 | 6/2018 |

OTHER PUBLICATIONS

"Office Action of Taiwan Counterpart Application," dated Oct. 28, 2019, p. 1-p. 7.

* cited by examiner

*Primary Examiner* — Phuong Chi Thi Nguyen
(74) *Attorney, Agent, or Firm* — JCIPRNET

(57) ABSTRACT

A wearable display device includes a first body, a first electrical connector and a connecting component. The first body has a display interface, and the first electrical connector is disposed on the first body. The connecting component is connected with the first body and adapted to fix different second bodies onto the first body. The first body and the second body transfer a signal through the first electrical connector.

21 Claims, 17 Drawing Sheets

WEARABLE DISPLAY DEVICE

CROSS-REFERENCE TO RELATED APPLICATION

This application claims the priority benefit of Taiwan application serial no. 108121898, filed on Jun. 24, 2019. The entirety of the above-mentioned patent application is hereby incorporated by reference herein and made a part of this specification.

BACKGROUND OF THE INVENTION

1. Field of the Invention

The present invention relates to a display device, and more particularly to a wearable display device.

2. Description of Related Art

With the increasing development of the technology industry, the types, use functions, and usage modes of display devices are becoming more and more diverse, and wearable display devices that can be directly worn on a user's body have emerged. The wearable display device may be a head mounted display device that can be applied to an augmented reality (AR) system, a virtual reality (VR) system, or a mixed reality (MR) system.

The head mounted display device is generally worn on the user's head using its wearing component, such as a head band. Different users have different head circumferences and head shapes, so the same wearing component is not suitable for all users. In addition, the functions of the head mounted display device cannot be changed or extended generally, the application field of a single product is limited, and it cannot be used in various fields such as industry, business, education, entertainment, and the like.

SUMMARY OF THE INVENTION

The present invention provides a wearable display device that can be applied to users having different head circumferences and head shapes and its application fields are relatively not limited.

The wearable display device of the present invention includes a first body, a first electrical connector and a connecting component. The first body has a display interface, and the first electrical connector is disposed on the first body. The connecting component is connected with the first body and adapted to fix different second bodies onto the first body. The first body and the second body transfer a signal through the first electrical connector.

In an embodiment of the present invention, the wearable display device includes at least one wearing component, where the at least one wearing component includes the second body and a second electrical connector, the second body is detachably connected to the first body, the second electrical connector is disposed on the second body and detachably connected to the first electrical connector, and the first body and the second body are adapted to transfer the signal to each other through the first electrical connector and the second electrical connector.

In an embodiment of the present invention, the at least one wearing component includes at least one pressure sensing element, and the at least one pressure sensing element is disposed on the second body and adapted to sense a pressure applied to the pressure sensing element to generate the signal.

In an embodiment of the present invention, after the first body is fixed to the at least one wearing component, a wearing space is formed between the first body and the at least one wearing component, and the at least one pressure sensing element faces the wearing space.

In an embodiment of the present invention, the display interface is adapted to display a prompt message based on the signal from the pressure sensing element.

In an embodiment of the present invention, the at least one wearing component includes at least one built-in function module, and the at least one built-in function module is disposed in the second body and adapted to generate or receive the signal.

In an embodiment of the present invention, the wearable display device includes at least one extended function module, where the at least one extended function module is connected between the first electrical connector and the second electrical connector.

In an embodiment of the present invention, the second body includes a first section and a second section, the first section is detachably connected to the first body, the second section is pivotally connected to the first section, and the second section is adapted to pivot relative to the first section to adjust an angle of inclination of the first body relative to the second body.

In an embodiment of the present invention, the connecting component includes at least one first engaging structure, the second body has a second engaging structure, and the at least one first engaging structure and the second engaging structure are adapted to be engaged with each other such that the second body is detachably connected to the first body.

In an embodiment of the present invention, the number of the at least one first engaging structure is two, and the two first engaging structures are respectively located at two opposite ends of the first body.

In an embodiment of the present invention, after the first body is fixed to the at least one wearing component, a wearing space is formed between the first body and the at least one wearing component, and the second engaging structure faces the wearing space.

In an embodiment of the present invention, the first engaging structure includes a fixing member and a sliding member, the sliding member is slidably disposed on the fixing member, the sliding member is adapted to slide to an engaging position to be engaged with the second engaging structure, and the sliding member is adapted to slide to a release position to release the second engaging structure.

In an embodiment of the present invention, the sliding member is located between the fixing member and the second engaging structure.

In an embodiment of the present invention, the sliding member includes an engaging end and an operating end connected to each other, the engaging end and the operating end are respectively located on two opposite sides of the fixing member, the engaging end is adapted to be engaged with the second engaging structure, and the operating end is adapted to slide the sliding member by an external force.

In an embodiment of the present invention, the fixing member has at least one first positioning portion, the sliding member has at least one second positioning portion, and when the sliding member is located at the engaging position, the at least one first positioning portion and the at least one second positioning portion are mutually positioned.

In an embodiment of the present invention, the at least one first positioning portion includes at least one trench, the at least one second positioning portion includes at least one flange, and the at least one flange is adapted to be positioned in the at least one trench.

In an embodiment of the present invention, the at least one second positioning portion includes at least one elastic arm, and the at least one flange is formed at an end of the at least one elastic arm and adapted to be positioned in the at least one trench by an elastic force of the at least one elastic arm.

In an embodiment of the present invention, the sliding member has at least one protrusion, the second engaging structure has at least one groove, and the at least one protrusion is adapted to be engaged with the at least one groove.

In an embodiment of the present invention, the sliding member is slidably disposed on the fixing member in a first direction, and when the sliding member is located at the engaging position and engaged with the second engaging structure, the sliding member prevents the second body from moving in a second direction perpendicular to the first direction.

A wearable display device of the present invention includes a first body, a first electrical connector and at least one wearing component. The first body has a display interface. The first electrical connector is disposed on the first body. The at least one wearing component includes a second body and a second electrical connector, where the second body is detachably connected to the first body, the second electrical connector is disposed on the second body and detachably connected to the first electrical connector, and the first body and the second body are adapted to transfer a signal to each other through the first electrical connector and the second electrical connector.

Based on the above, in the wearable display devices of the present invention, the wearing component is detachably connected to the first body, so that the user can replace the different wearing components as needed. For example, the user can select a wearing component having a suitable size according to the head circumference and the head shape, or can select a wearing component having a specific function module depending on the application field. Thereby, the versatility of the wearable display device can be improved.

In order to make the aforementioned and other objectives and advantages of the present invention comprehensible, embodiments accompanied with figures are described in detail below.

DESCRIPTION OF THE EMBODIMENTS

Figure 1:
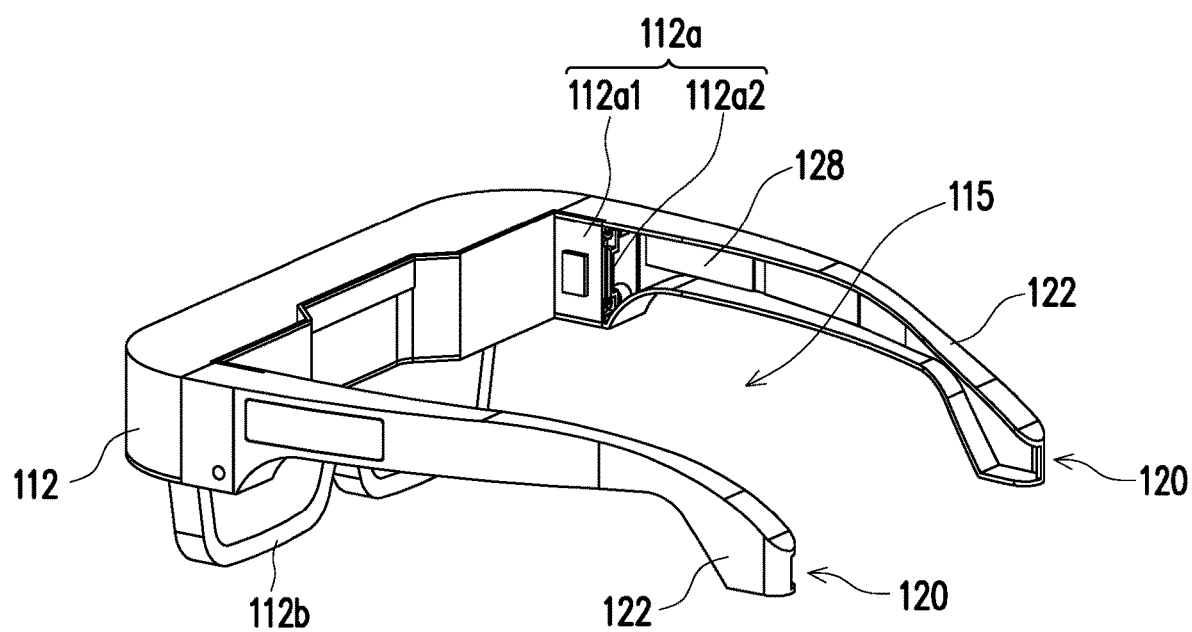
FIG. 1 is a three-dimensional view of a wearable display device according to an embodiment of the present invention.
Figure 2:
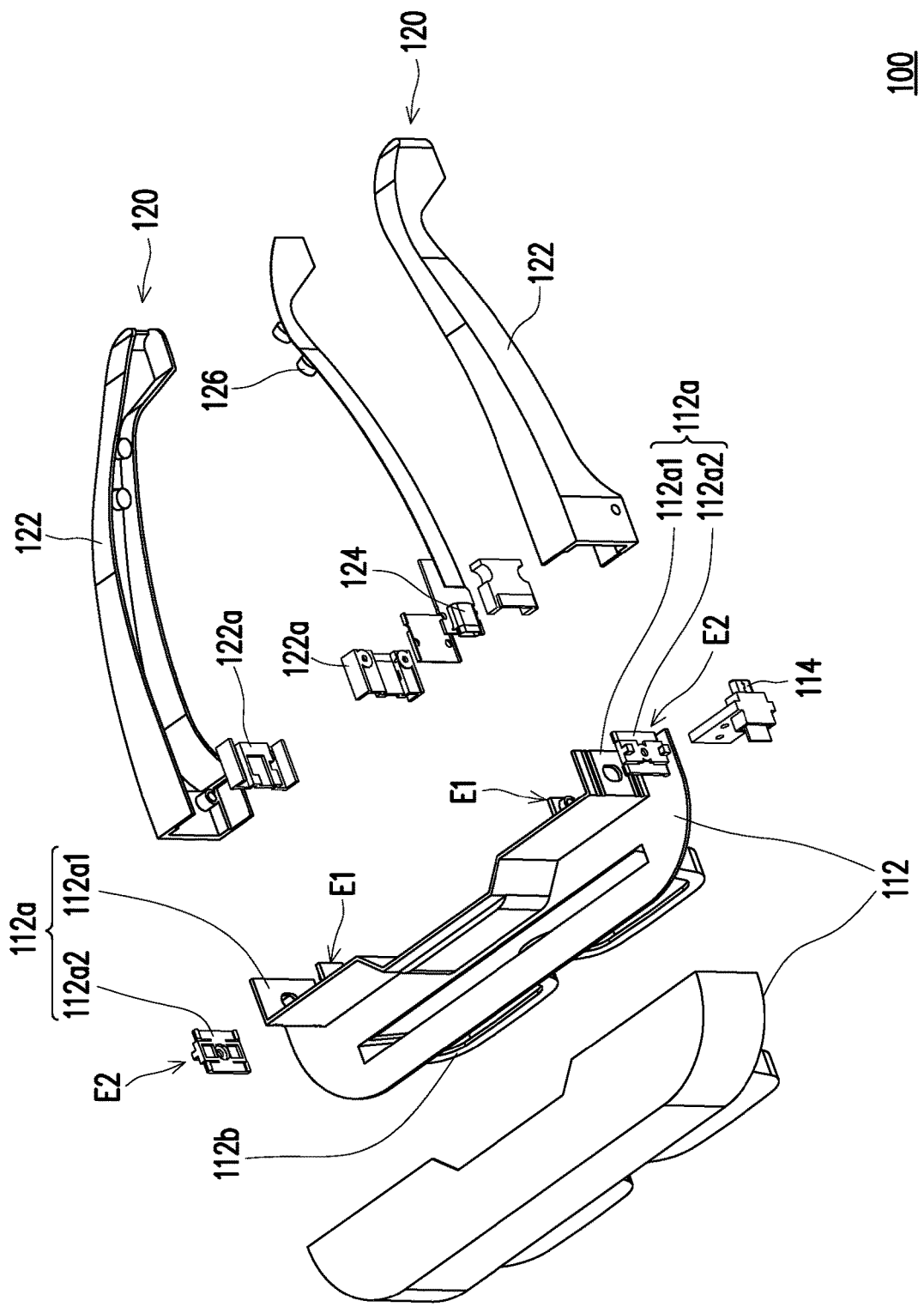
FIG. 2 is an exploded view of the wearable display device of FIG. 1.

FIG. 1 is a three-dimensional view of a wearable display device according to an embodiment of the present invention. FIG. 2 is an exploded view of the wearable display device of FIG. 1. Referring to FIG. 1 and FIG. 2, the wearable display device 100 of the present embodiment includes a first body 112, a first electrical connector 114 and at least one wearing component 120 (two are shown). The first body 112 has a display interface 112b, and the first electrical connector 114 is disposed on the first body 112. The wearing component 120 includes a second body 122 and a second electrical connector 124, the second body 122 is detachably connected to the first body 112, and the second electrical connector 124 is disposed on the second body 122 and detachably connected to the first electrical connector 114. The first body 112 and the second body 122 of the wearing component 120 are adapted to transfer a signal (such as a sensing signal or a function signal) to each other through the first electrical connector 114 and the second electrical connector 124.

Since the wearing component 120 is detachably connected to the first body 112 as described above, a user can replace the different wearing components 120 as needed. For example, the user can select a wearing component 120 having a suitable size according to the head circumference and the head shape, or can select a wearing component 120 having a specific function module depending on the application field. Thereby, the versatility of the wearable display device 100 can be improved. This will be described in detail below.

Figure 3:
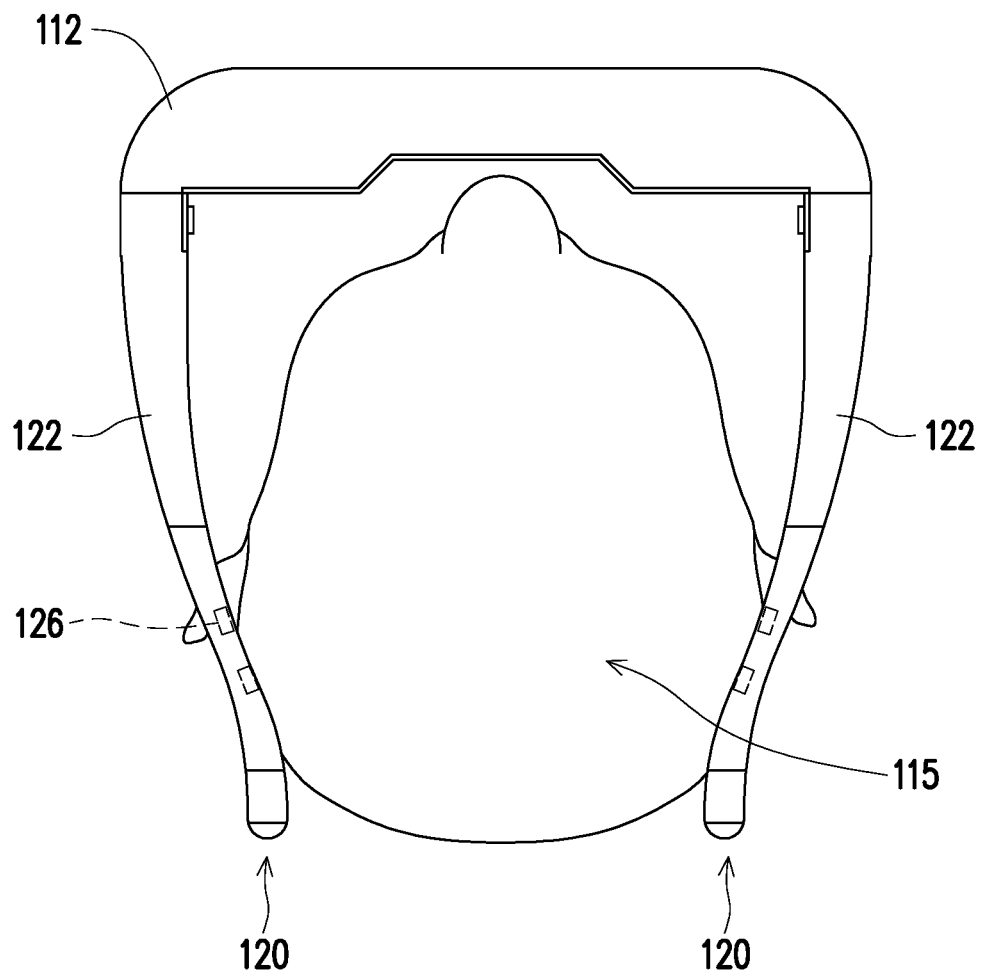
FIG. 3 shows a user wearing the wearable display device of FIG. 1.

FIG. 3 shows the user wearing the wearable display device of FIG. 1. Referring to FIG. 2 and FIG. 3, in detail, the wearing component 120 includes at least one pressure sensing element 126 (more are shown), and the pressure sensing element 126 is disposed on the second body 122 of the wearing component 120. When the user wears the wearable display device 100 as shown in FIG. 3, the pressure sensing element 126 is adapted to sense a pressure of the user's head applied to the pressure sensing element 126 to generate a sensing signal and transfer it to the first body 112. The display interface 112b of the first body 112 is adapted to display a prompt message based on the signal from the pressure sensing element 126 to let the user know whether the currently worn wearing component 120 is too tight or too loose. If the wearing component 120 is too tight or too loose, the user can dismount it from the first body 112 and replace it with a wearing component 120 of another different size. If the wearing component 120 is not too tight or too loose, the user can begin to operate and use the wearable display device 100.

In other embodiments, an actuating element such as a drive motor or the like can be disposed in each of the wearing components 120 for adjusting the tightness of the wearing component 120 according to the sensing result of the pressure sensing element 126. In addition, each of the wearing components 120 can be designed to have a movable joint or an adjustable strap such that the tightness can be adjusted manually, which is not limited by the present invention.

As shown in FIG. 3, after the first body 112 is assembled and fixed with the wearing component 120, a wearing space 115 is formed therebetween corresponding to the position of the user's head, and the pressure sensing element 126 is disposed to face the wearing space 115 (i.e., the pressure sensing element 126 is disposed on one side close to the wearing space 115), so that the pressure sensing element 126 can positively contact the user's head. In addition, a plurality of pressure sensing elements 126 are disposed as shown in FIG. 3, and multi-point sensing can be performed to effectively improve the accuracy of the sensing pressure.

On the other hand, as shown in FIG. 1, the wearing component 120 of the present embodiment includes at least one built-in function module 128 (shown as more), and the built-in function module 128 is disposed in the second body 122 of the wearing component 120 and adapted to generate or receive a function signal. The user can apply the wearable display device 100 to different fields by replacing the wearing components having different built-in function modules.

Figure 4:
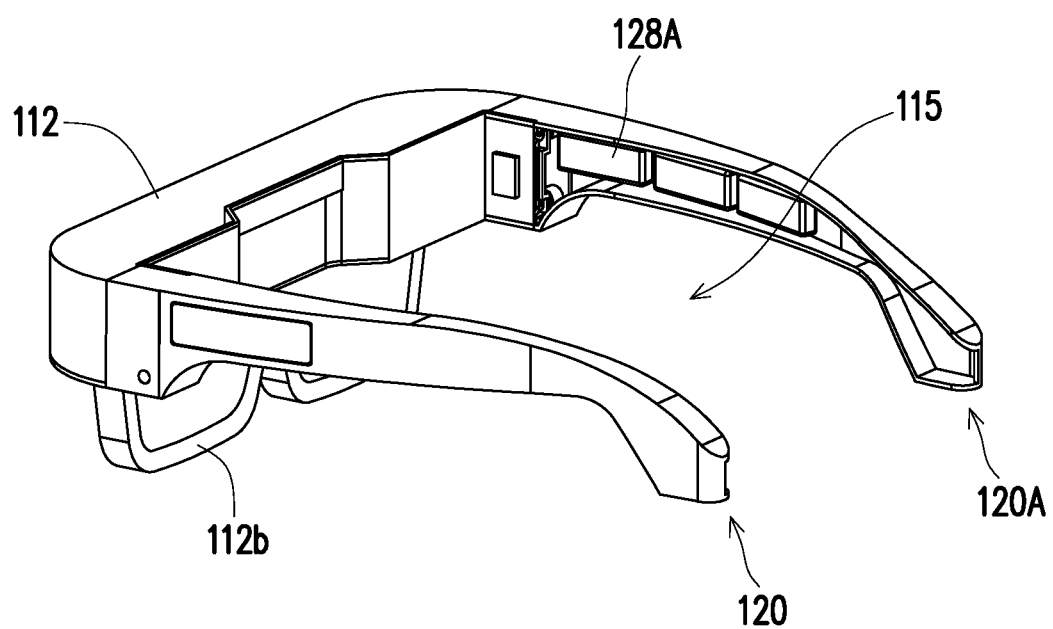
FIG. 4 shows the wearable display device of FIG. 1 in which a wearing component having different built-in function modules is replaced.

FIG. 4 shows the wearable display device of FIG. 1 in which the wearing component having different built-in function modules is replaced. Specifically, the user can replace the wearing component 120 having the two built-in function modules 128 shown in FIG. 1 with a wearing component 120A having three built-in function modules 128A as shown in FIG. 4, and the functionality of the built-in function module 128A may differ from the functionality of the built-in function module 128. For example, the built-in function module 128 shown in FIG. 1 may include a battery module for extending standby and usage time or a function module having various audio-visual entertainment functions to be suitable for the field of home entertainment, and the built-in function module 128A shown in FIG. 4 may include an environmental sensing module such as an illuminance sensing module or the like to be suitable for the field of home intelligence. In addition, the built-in function module may also include a signal transmission module and a touch operation module to be suitable for the static teaching field or other fields, which is not limited by the present invention.

Figure 5A:
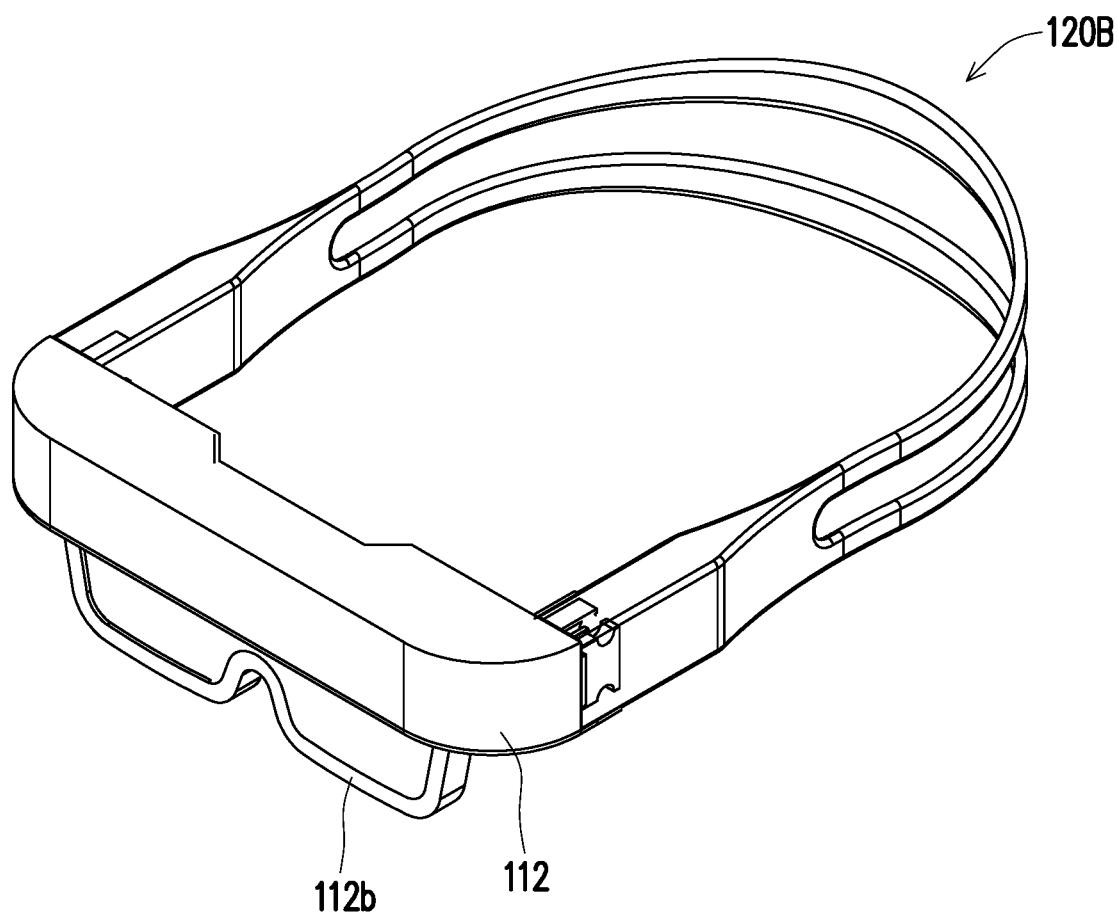
FIG. 5A to FIG. 5C show the wearable display device of FIG. 1 in which different forms of wearing components are replaced.
Figure 5B:
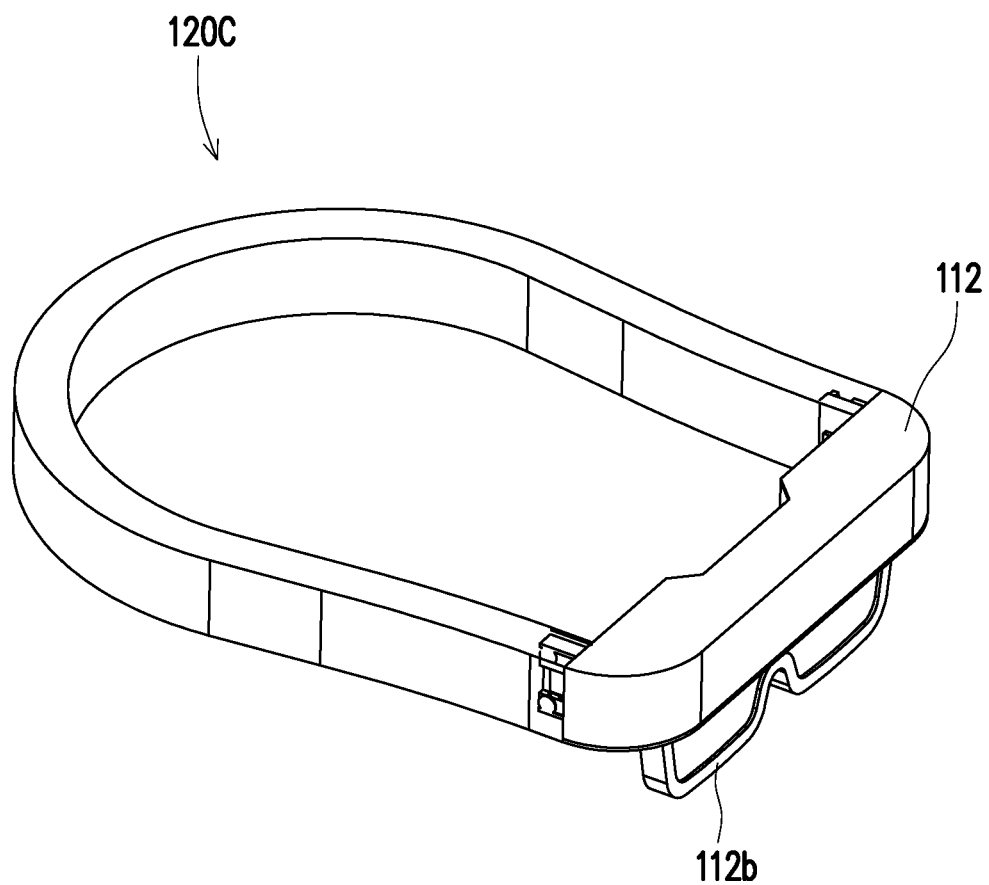
Figure 5C:
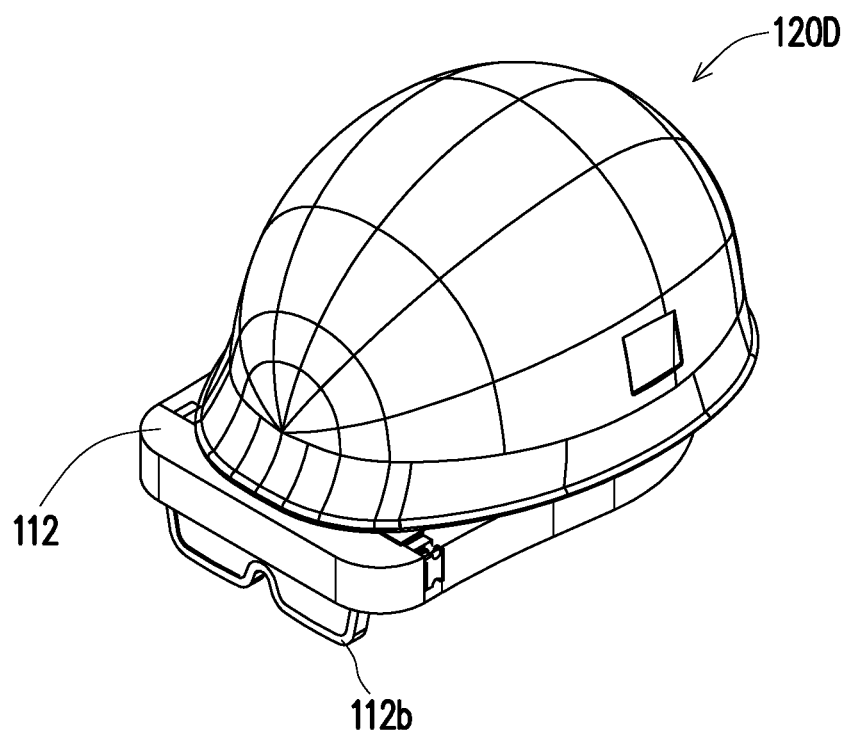

FIG. 5A to FIG. 5C show the wearable display device of FIG. 1 in which different forms of wearing components are replaced. Temple-type wearing component 120, 120A shown in FIG. 1 and FIG. 4 is suitable for home entertainment or static teaching as described above. The user can replace it with a lightweight soft wearing component 120B shown in FIG. 5A to be suitable for the field of outdoor sports or outdoor teaching, or replace it with a wrapped wearing component 120C shown in FIG. 5B to be suitable for the fields of commercial applications, medical institutions, simulated training, etc., or replace it with a helmet-type wearing component 120D shown in FIG. 5C to be suitable for the fields of industry, military matters, etc., which is not limited by the present invention.

Figure 6:
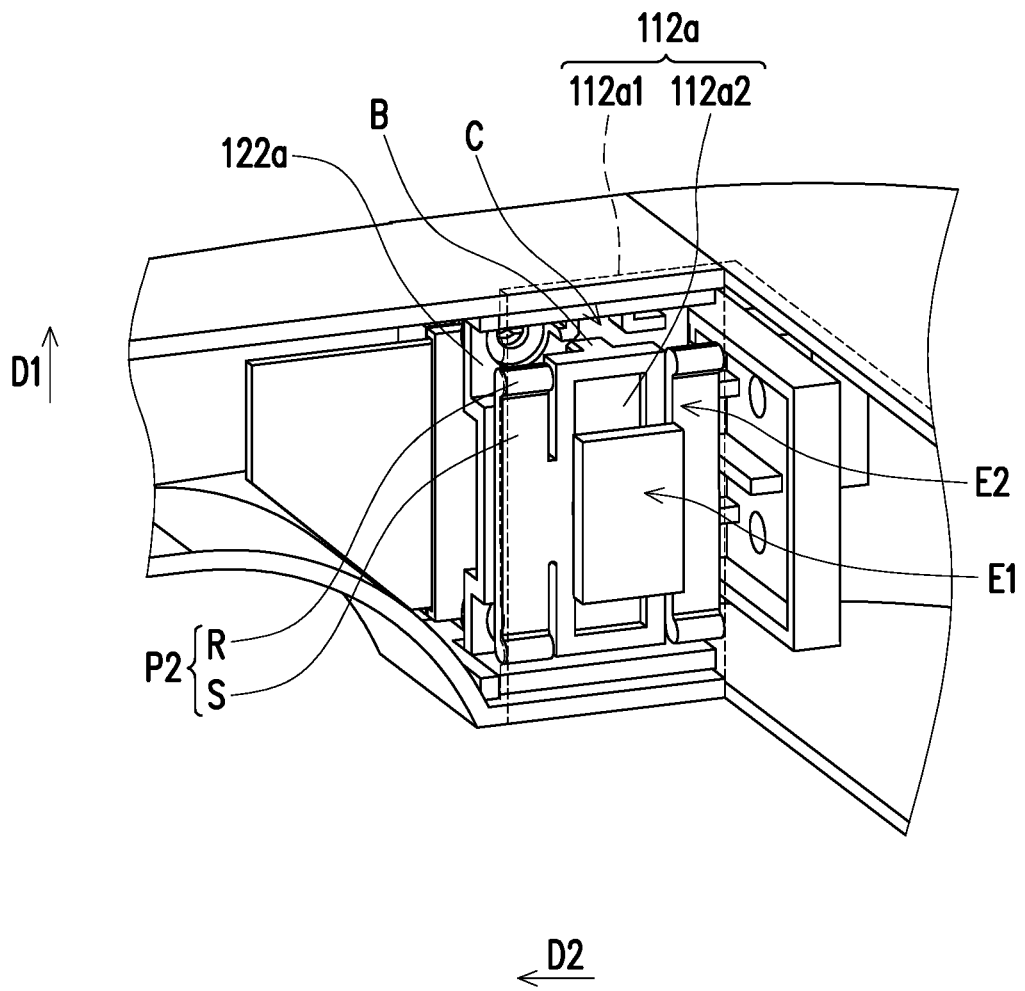
FIG. 6 is a partial three-dimensional view of the wearable display device of FIG. 1.
Figure 7:
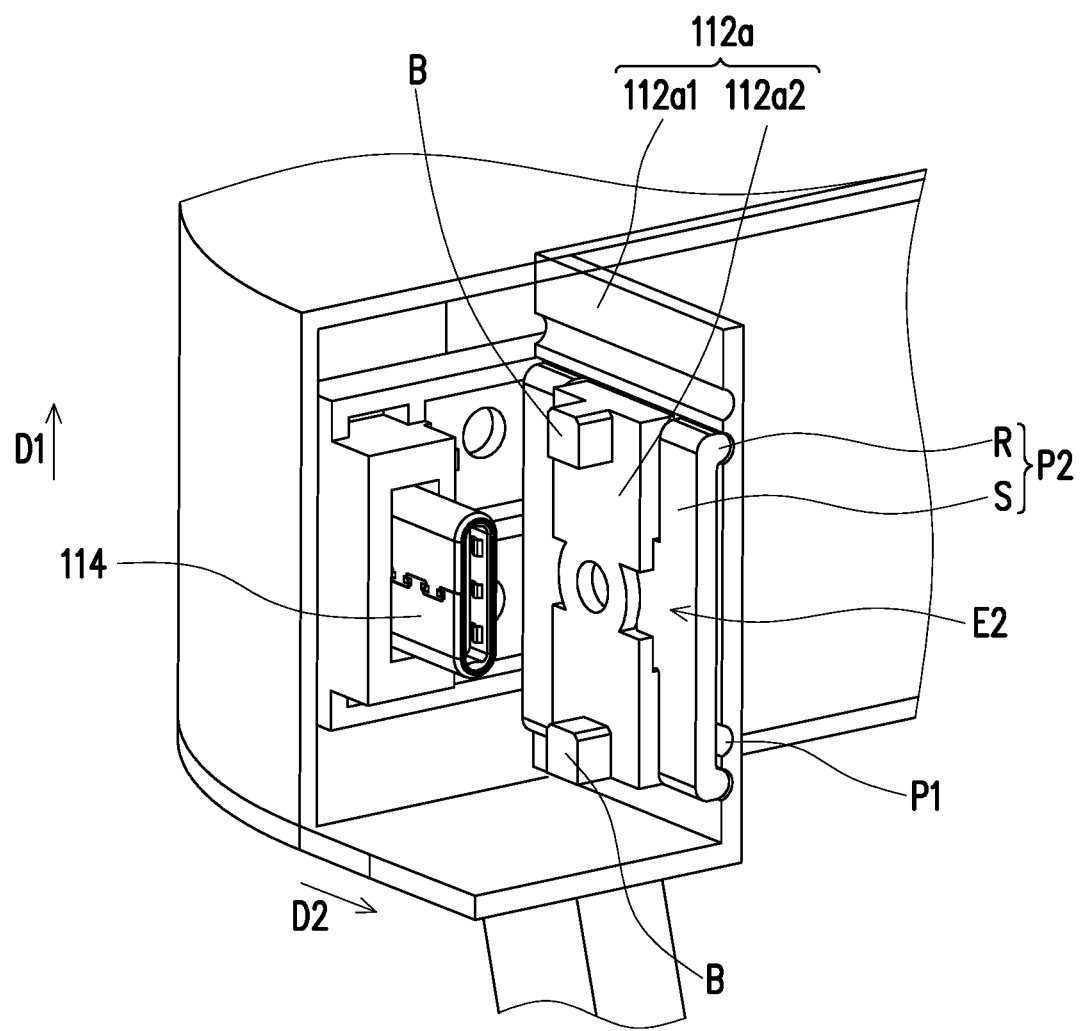
FIG. 7 is a partial three-dimensional view of the wearable display device of FIG. 1.

The manner in which the first body 112 of FIG. 1 and the second body 122 of the wearing component 120 are connected will be specifically described below. FIG. 6 is a partial three-dimensional view of the wearable display device of FIG. 1. FIG. 7 is a partial three-dimensional view of the wearable display device of FIG. 1. Referring to FIG. 2, FIG. 6, and FIG. 7, the first body 112 of the present embodiment has a connecting component, such as two first engaging structures 112a. The two first engaging structures 112a are respectively located at two opposite ends of the first body 112, each of the second bodies 122 has a second engaging structure 122a, and the first engaging structure 112a and the second engaging structure 122a are adapted to be engaged with each other such that the second body 122 is detachably connected to the first body 112. The second engaging structure 122a is disposed to face the wearing space 115 (i.e., disposed on one side, close to the head, in the second body 122) such that the second engaging structure 122a and the first engaging structure 112a engaged therewith are located on the inner side of the device, so that the device as a whole has a better appearance.

In detail, the first engaging structure 112a of the present embodiment includes a fixing member 112a1 and a sliding member 112a2. The fixing member 112a1 is, for example, integrally formed with a housing of the first body 112, and the sliding member 112a2 includes an engaging end E1 and an operating end E2 connected to each other and is slidably disposed on the fixing member 112a1 in a first direction D1. The engaging end E1 and the operating end E2 are respectively located on two opposite sides of the fixing member 112a1, and the engaging end E1 of the sliding member 112a2 is located between the fixing member 112a1 and the second engaging structure 122a. The fixing member 112a1 has at least one first positioning portion P1 (shown as two), and each of the first positioning portions P1 is, for example, a trench. The sliding member 112a2 has at least one second positioning portion P2 (shown as more) corresponding to the first positioning portion P1, and each of the second positioning portions P2 may include a flange R and an elastic arm S. The flange R is formed at an end of the elastic arm S. In addition, the engaging end E1 of the sliding member 112a2 has at least one protrusion B (shown as two), and the second engaging structure 122a has a groove C corresponding to the protrusion B.

The user may apply a force to the operating end E2 to thereby slide the sliding member 112a2 to the release position shown in FIG. 6 and FIG. 7 by the external force. At this time, the protrusion B of the sliding member 112a2 is not engaged with the groove C of the second engaging structure 122a, and the flange R included in the second positioning portion P2 of the sliding member 112a2 is not positioned to the trench (first positioning portion P1) of the fixing member 112a1, so that the user can dismount the wearing component 120 from the first body 112. On the contrary, the user can apply a force to the operating end E2 to thereby slide the sliding member 112a2 from the release position shown in FIG. 6 and FIG. 7 in a first direction D1 to an engaging position, so that the engaging end E1 of the sliding member 112a2 of the first engaging structure 112a is engaged with the groove C of the second engaging structure 122a by the protrusion B thereof to prevent the second body 122 from moving in a second direction D2 perpendicular to the first direction D1, and the flange R of the second positioning portion P2 of the sliding member 112a2 is positioned in the trench (first positioning portion P1) of the fixing member 112a1 by the elastic force of the elastic arm S to firmly connect the wearing component 120 to the first body 112.

Figure 8:
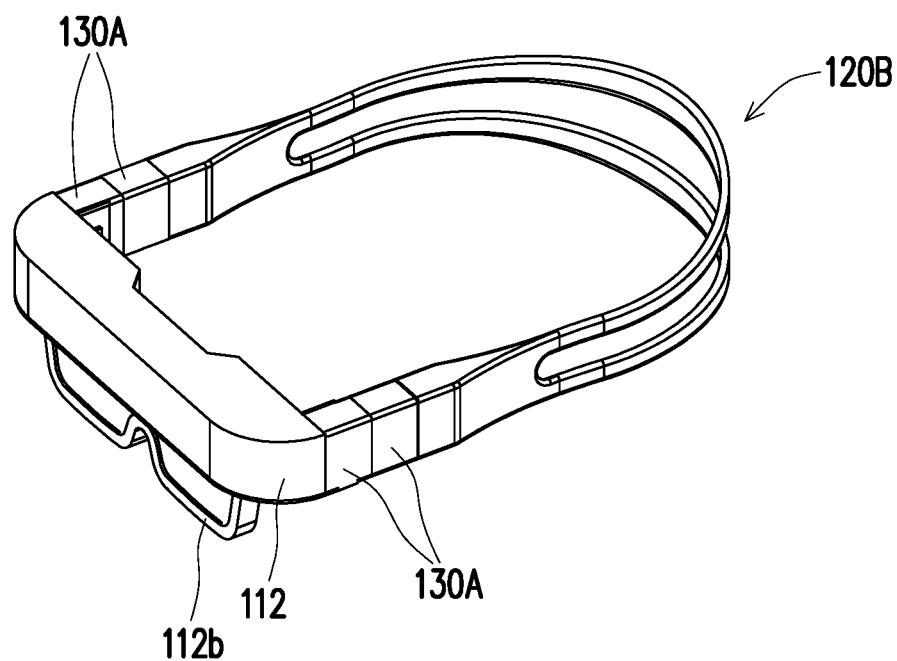
FIG. 8 shows the wearable display device of FIG. 5A with an additional extended function module.
Figure 9:
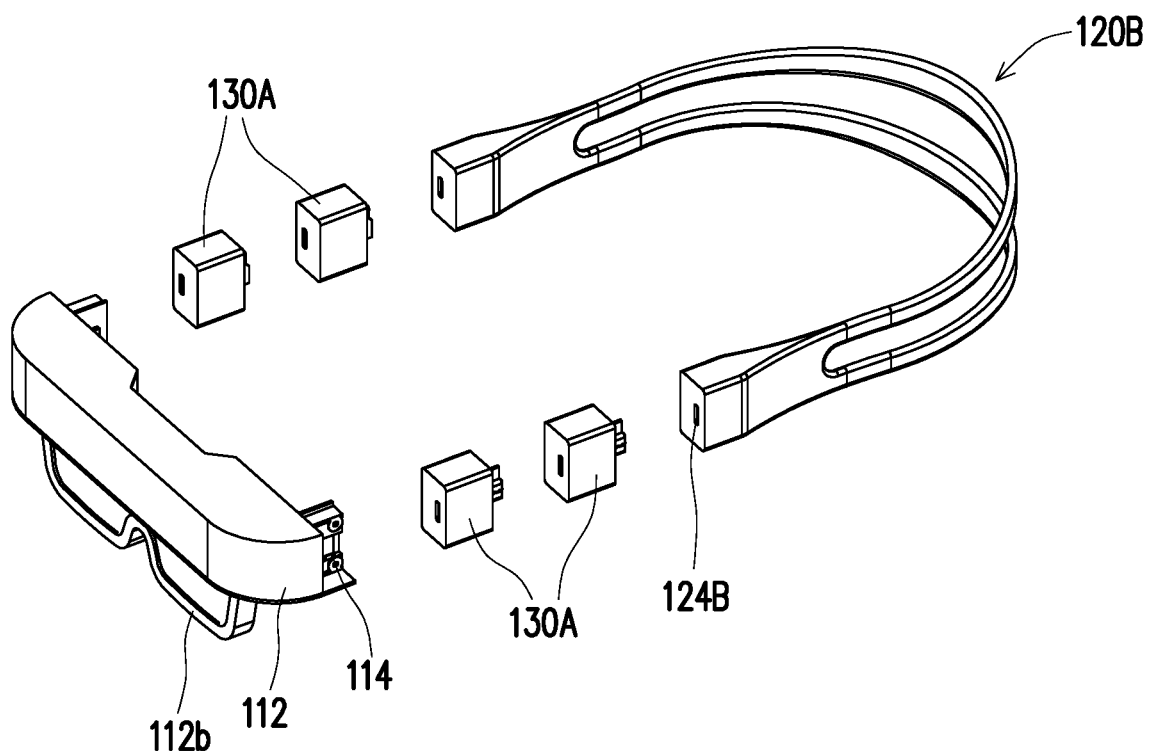
FIG. 9 is an exploded view of the wearable display device of FIG. 8.

FIG. 8 shows the wearable display device of FIG. 5A with an additional extended function module. FIG. 9 is an exploded view of the wearable display device of FIG. 8. Referring to FIG. 8, the wearable display device may further include at least one extended function module 130A (shown as more). The user can connect the extended function module 130A having a required function between the first electrical connector 114 and a second electrical connector 124B of the wearing component 120B as needed to meet different usage situations. For example, the extended function module 130A may be a function module suitable for the field of outdoor sports, such as a speedometer, a global positioning system (GPS), a water pressure sensor, a height sensor or the like. In the present embodiment, each of the extended function modules 130 is connected by an engaging structure the same as or similar to that shown in FIG. 6 and FIG. 7 except that it is plugged by its electrical connector, which is not limited by the present invention.

Figure 10:
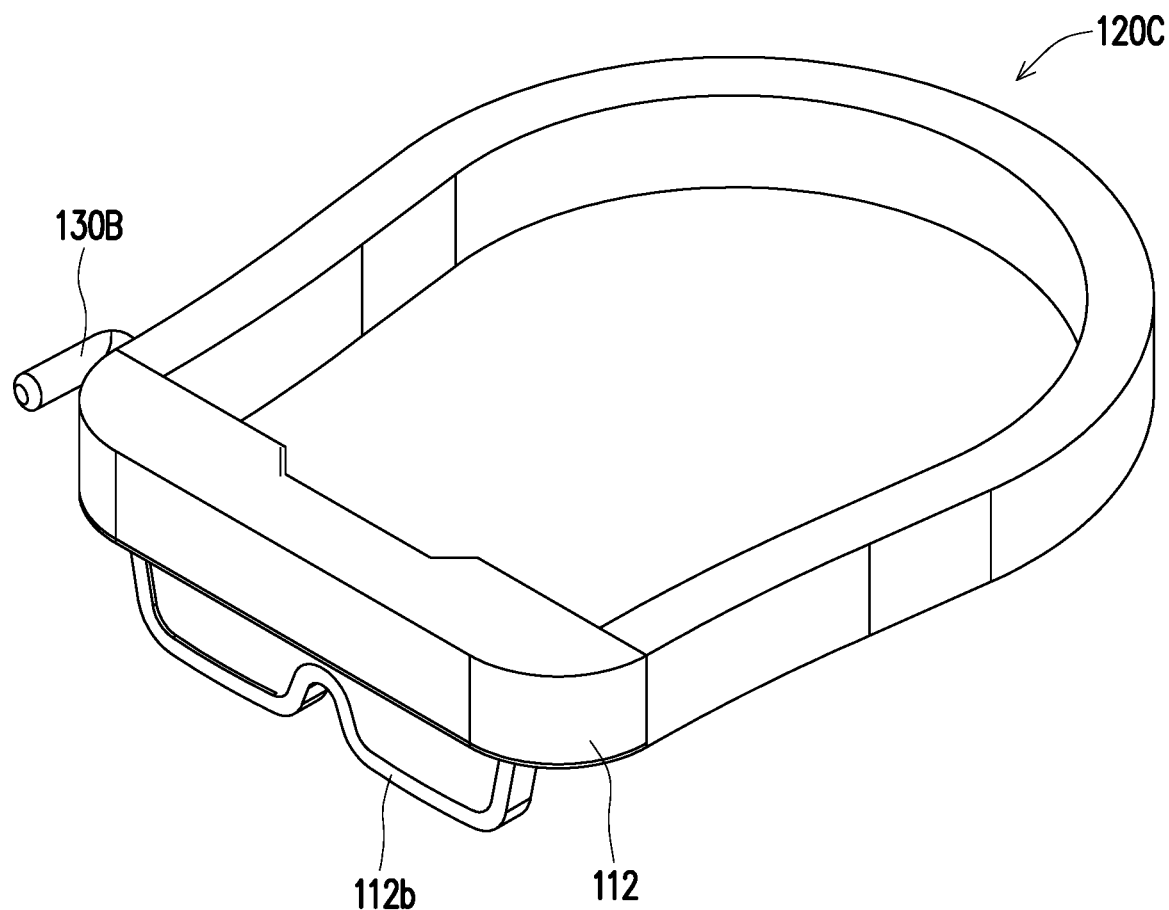
FIG. 10 shows the wearable display device of FIG. 5B with an additional extended function module.

FIG. 10 shows the wearable display device of FIG. 5B with an additional extended function module. Referring to FIG. 10, the extended function module 130B of the wearable display device may be a projector to be suitable for the field of commercial applications (for example, for product briefing), or be matched with a signal transmission module and a touch operation module to be suitable for the field of medical use (for example, for medical teaching or for condition and case briefing). In the present embodiment, the extended function module 130B may also be a built-in function module, which is not limited by the present invention.

Figure 11A:
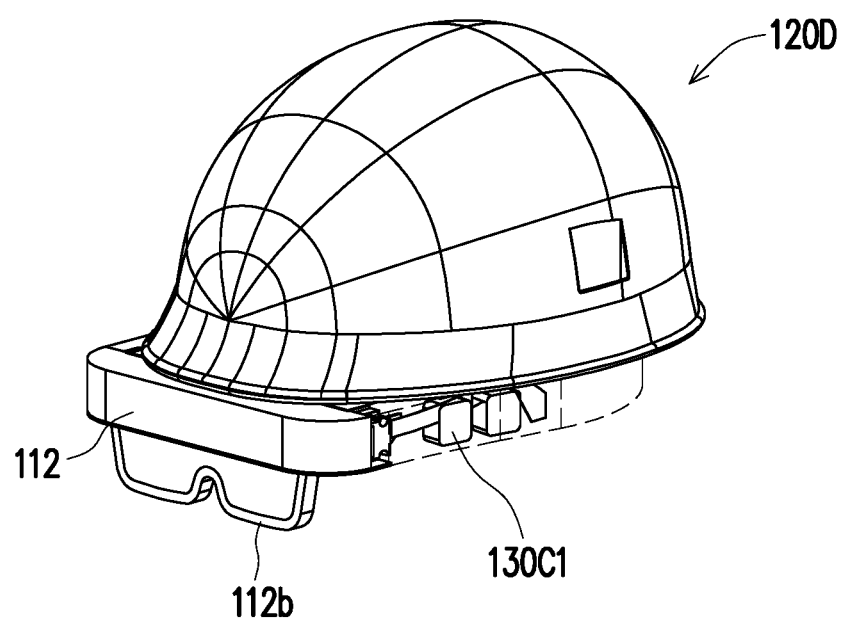
FIG. 11A to FIG. 11C show a built-in function module or an additional extended function module of the wearable display device of FIG. 5C.
Figure 11B:
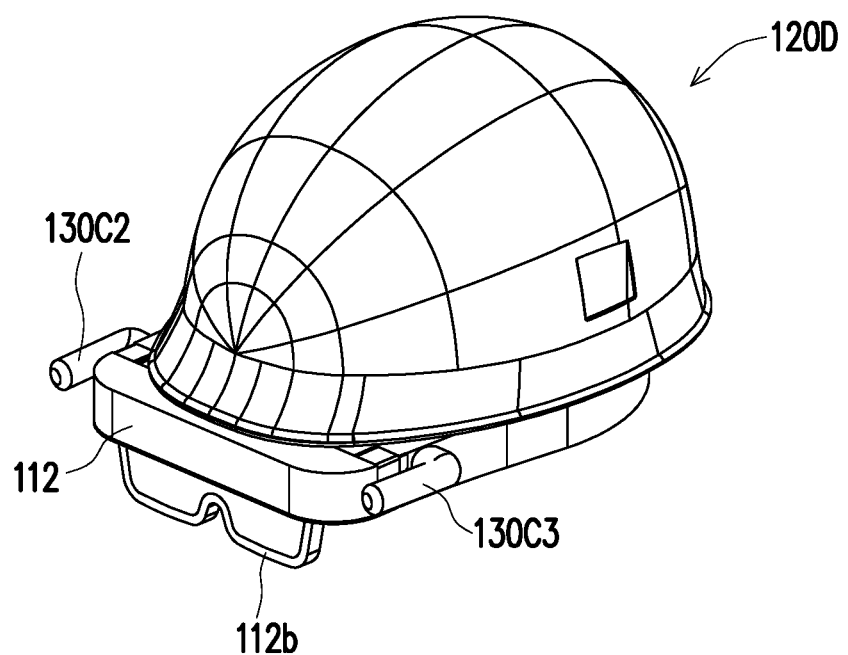
Figure 11C:
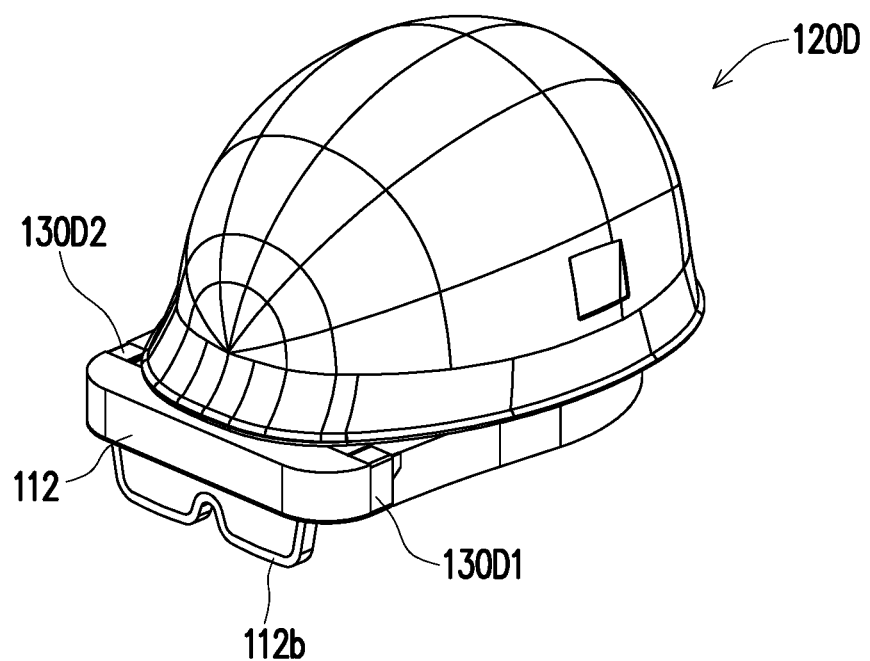

FIG. 11A to FIG. 11C show a built-in function module or an additional extended function module of the wearable display device of FIG. 5C. A built-in function module 130C1 of the wearable display device of FIG. 11A may be a fan module to be suitable for a high temperature industrial environment. Built-in function modules 130C2 and 130C3 (or extended function modules) of the wearable display device of FIG. 11B may be respectively an LED lighting module and an infrared detecting module to be suitable for an underground mining environment such as coal mines, petroleum or the like. Extended function modules 130D1 and 130D2 of the wearable display device of FIG. 11C may respectively be a noise/electromagnetic wave/radiation/illuminance detecting module and a temperature/humidity/carbon dioxide sensing module to be suitable for an industrial environment to remind the user whether the environment is harmful to the human body. In addition, a built-in or extended telescope, night vision goggle, and map terrain function module may also be installed in the wearable display device of FIG. 5C to be suitable for the field of military applications.

Figure 12:
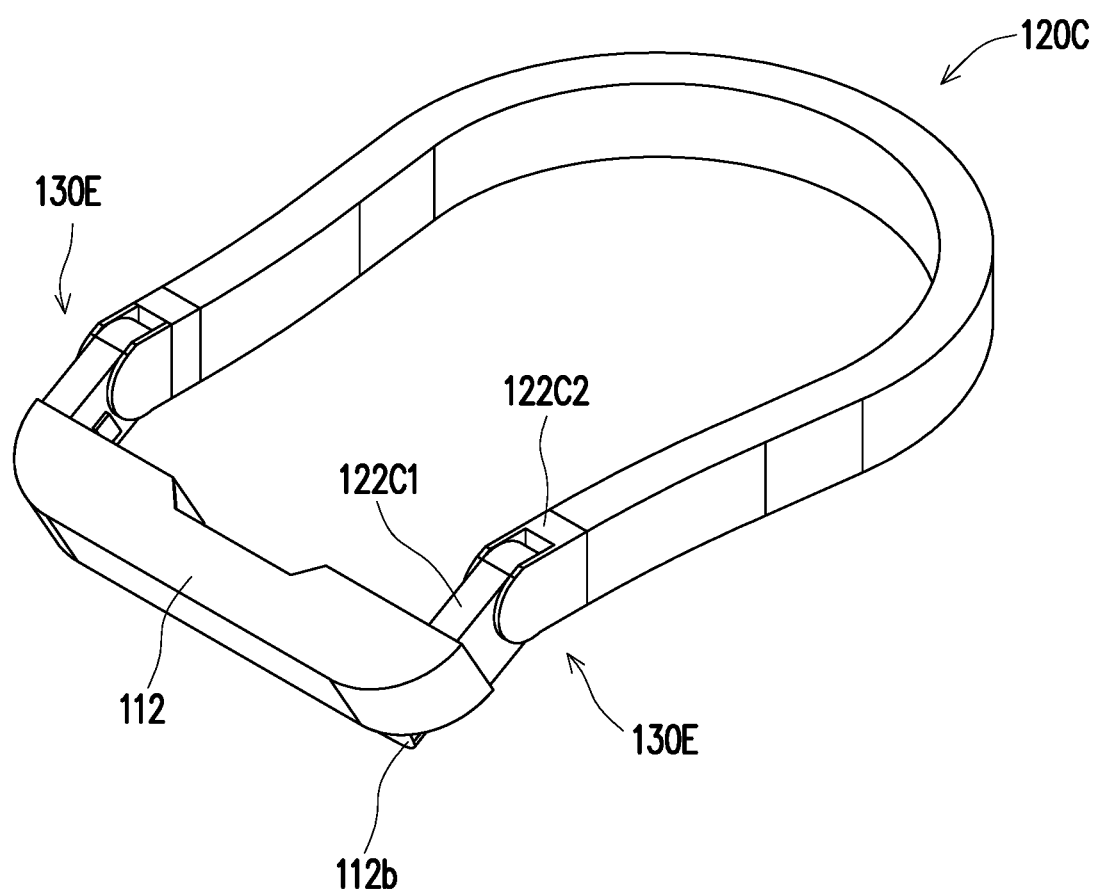
FIG. 12 shows the wearable display device of FIG. 5B with an additional extended function module.

FIG. 12 shows the wearable display device of FIG. 5B with an additional extended function module. Referring to FIG. 12, the extended function module 130E of the wearable display device may be an angle adjustment module. After the angle adjustment module is installed, the angle adjustment module can be regarded as a part of a second body 122C, so that the second body 122C includes a first section 122C1 and a second section 122C2, the first section 122C1 is detachably connected to the first body 112, the second section 122C2 is pivotally connected to the first section 122C1, and the second section 122C2 is adapted to pivot relative to the first section 122C1 to adjust the angle of inclination of the first body 112 relative to the second body 122C. Thus, the user can be more comfortable in a use situation where it is necessary to maintain a diagonally upward viewing angle or a diagonally downward viewing angle for a long time. In the present embodiment, the extended function module 130E may also be a built-in function module, which is not limited by the present invention.

Figure 13:
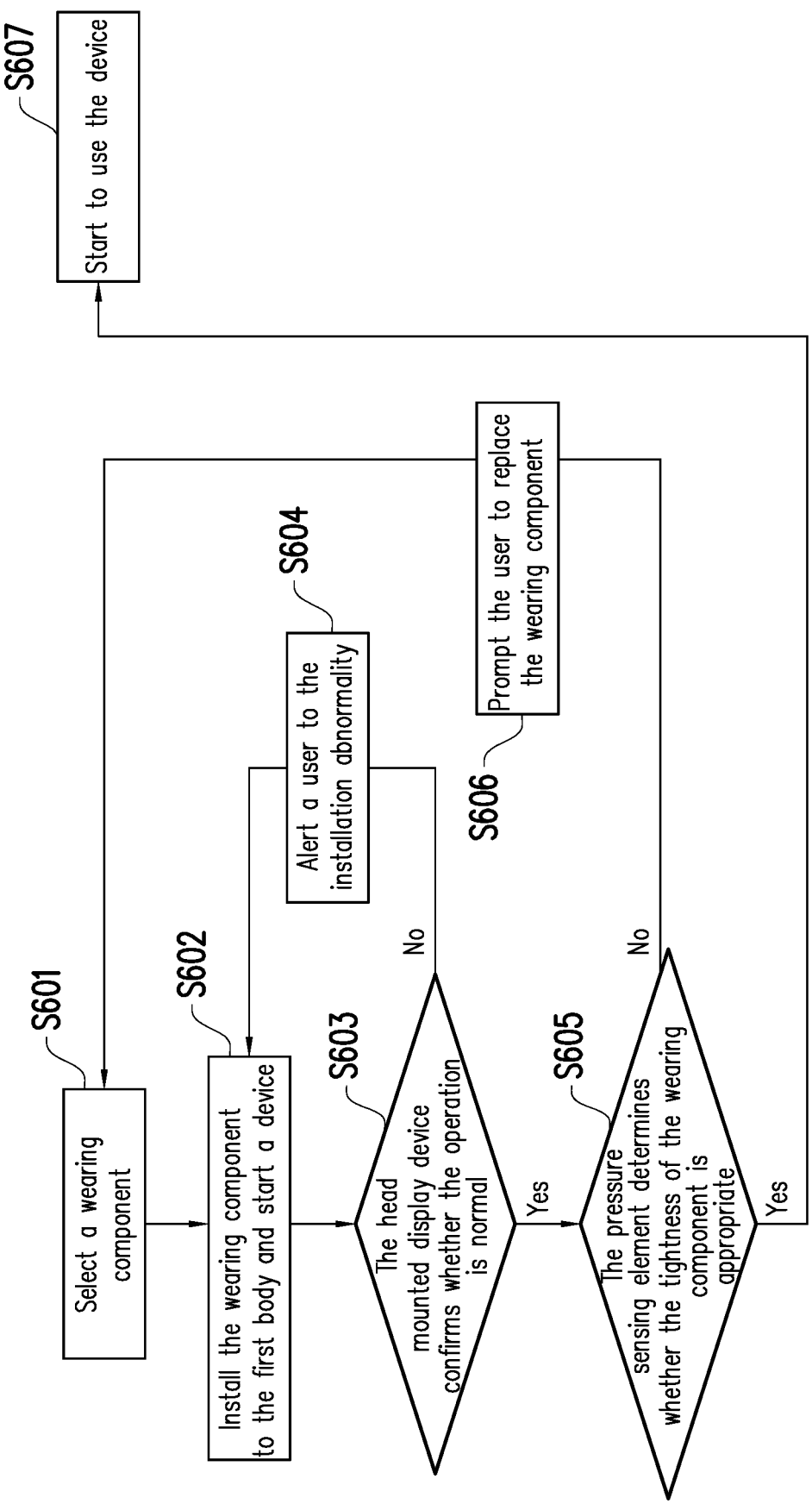
FIG. 13 is an operation flow chart of a wearable display device according to an embodiment of the present invention.

An operation flow of the wearable display devices of the above embodiments will be exemplified below. FIG. 13 is an operation flow chart of a wearable display device according to an embodiment of the present invention. First, the user selects a wearing component (step S601), installs the wearing component to the first body, and starts the device (step S602). Next, a system of the wearable display device confirms whether the operation is normal (step S603), which is, for example, determining whether the electrical connector is normally connected. If the operation is not normal, the user is alerted to the installation abnormality (step S604) and returns to step S602. If the operation is normal, the pressure sensing element determines whether the tightness of the wearing component is appropriate (step S605). If the tightness is not appropriate, the user is prompted to replace the wearing component (step S606) and return to step S601. If the tightness is appropriate, the device is started to be used (step S607).

Although the present invention has been disclosed as above with the embodiments, the embodiments are not intended to limit the present invention. Any person of ordinary skill in the art can make some changes and modifications without departing from the spirit and scope of the present invention. Therefore, the protection scope of the present invention shall be defined by the appended claims.

What is claimed is:

1. A wearable display device, comprising:
   a first body, having a display interface;
   a first electrical connector, disposed on the first body; and
   a connecting component, the connecting component being connected with the first body and adapted to detachably fix different second bodies onto the first body, wherein the first body and the second body transfer a signal through the first electrical connector.

2. The wearable display device according to claim 1, wherein the second body comprises a first section and a second section, the first section is detachably connected to the first body, the second section is pivotally connected to the first section, and the second section is adapted to pivot relative to the first section to adjust an angle of inclination of the first body relative to the second body.

3. The wearable display device according to claim 1, comprising at least one wearing component, wherein the at least one wearing component comprises the second body and a second electrical connector, the second body is detachably connected to the first body, the second electrical connector is disposed on the second body and detachably connected to the first electrical connector, and the first body and the second body are adapted to transfer the signal to each other through the first electrical connector and the second electrical connector.

4. The wearable display device according to claim 3, wherein the at least one wearing component comprises at least one built-in function module, and the at least one built-in function module is disposed in the second body and adapted to generate or receive the signal.

5. The wearable display device according to claim 3, comprising at least one extended function module, wherein the at least one extended function module is connected between the first electrical connector and the second electrical connector.

6. The wearable display device according to claim 3, wherein the at least one wearing component comprises at least one pressure sensing element, and the at least one pressure sensing element is disposed on the second body and adapted to sense a pressure applied to the pressure sensing element to generate the signal.

7. The wearable display device according to claim 6, wherein after the first body is fixed to the at least one wearing component, a wearing space is formed between the first body and the at least one wearing component, and the at least one pressure sensing element faces the wearing space.

8. The wearable display device according to claim 6, wherein the display interface is adapted to display a prompt message based on the signal from the pressure sensing element.

9. The wearable display device according to claim 1, wherein the connecting component comprises at least one first engaging structure, the second body has a second engaging structure, and the at least one first engaging structure and the second engaging structure are adapted to be engaged with each other such that the second body is detachably connected to the first body.

10. The wearable display device according to claim 9, wherein the number of the at least one first engaging structure is two, and the two first engaging structures are respectively located at two opposite ends of the first body.

11. The wearable display device according to claim 9, wherein after the first body is fixed to the at least one wearing component, a wearing space is formed between the first body and the at least one wearing component, and the second engaging structure faces the wearing space.

12. The wearable display device according to claim 9, wherein the first engaging structure comprises a fixing member and a sliding member, the sliding member is slidably disposed on the fixing member, the sliding member is adapted to slide to an engaging position to be engaged with the second engaging structure, and the sliding member is adapted to slide to a release position to release the second engaging structure.

13. The wearable display device according to claim 12, wherein the sliding member is located between the fixing member and the second engaging structure.

14. The wearable display device according to claim 12, wherein the sliding member comprises an engaging end and an operating end connected to each other, the engaging end and the operating end are respectively located on two opposite sides of the fixing member, the engaging end is adapted to be engaged with the second engaging structure, and the operating end is adapted to slide the sliding member by an external force.

15. The wearable display device according to claim 12, wherein the sliding member has at least one protrusion, the second engaging structure comprises at least one groove, and the at least one protrusion is adapted to be engaged with the at least one groove.

16. The wearable display device according to claim 12, wherein the sliding member is slidably disposed on the fixing member in a first direction, and when the sliding member is located at the engaging position and engaged with the second engaging structure, the sliding member prevents the second body from moving in a second direction perpendicular to the first direction.

17. The wearable display device according to claim 12, wherein the fixing member has at least one first positioning portion, the sliding member has at least one second positioning portion, and when the sliding member is located at the engaging position, the at least one first positioning portion and the at least one second positioning portion are mutually positioned.

18. The wearable display device according to claim 17, wherein the at least one first positioning portion comprises at least one trench, the at least one second positioning portion comprises at least one flange, and the at least one flange is adapted to be positioned in the at least one trench.

19. The wearable display device according to claim 18, wherein the at least one second positioning portion comprises at least one elastic arm, and the at least one flange is formed at an end of the at least one elastic arm and adapted to be positioned in the at least one trench by an elastic force of the at least one elastic arm.

20. A wearable display device, comprising:
a first body, having a display interface;
a first electrical connector, disposed on the first body;
at least one wearing component, comprising a second body and a second electrical connector, wherein the second body is detachably connected to the first body, the second electrical connector is disposed on the second body and detachably connected to the first electrical connector, and the first body and the second body are adapted to transfer a signal to each other through the first electrical connector and the second electrical connector; and
a connecting component, the connecting component being slidably connected and fixed with the first body and the second body.

21. A wearable display device, comprising:
a first body, having a display interface;
a first electrical connector, disposed on the first body; and
a connecting component, the connecting component being connected with the first body and adapted to fix different second bodies onto the first body, wherein the first body and the second body transfer a signal through the first electrical connector,
wherein the second body comprises a first section and a second section, the first section is detachably connected to the first body, the second section is pivotally connected to the first section, and the second section is adapted to pivot relative to the first section to adjust an angle of inclination of the first body relative to the second body.

* * * * *